US009886869B2

(12) United States Patent
Galen et al.

(10) Patent No.: US 9,886,869 B2
(45) Date of Patent: *Feb. 6, 2018

(54) FRACTAL-BASED DECISION ENGINE FOR INTERVENTION

(71) Applicant: Pearson Education, Inc., New York, NY (US)

(72) Inventors: William M. Galen, Arlington, MA (US); Rasil Warnakulasooriya, Medfield, MA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,092

(22) Filed: Sep. 23, 2016

(65) Prior Publication Data

US 2017/0011646 A1  Jan. 12, 2017

Related U.S. Application Data

(63) Continuation of application No. 14/302,822, filed on Jun. 12, 2014, now Pat. No. 9,483,955, which is a
(Continued)

(51) Int. Cl.
| | |
|---|---|
| *G09B 3/00* | (2006.01) |
| *G09B 7/04* | (2006.01) |
| *G09B 5/00* | (2006.01) |
| *G09B 7/08* | (2006.01) |
| G09B 17/00 | (2006.01) |
| G09B 7/02 | (2006.01) |

(Continued)

(52) U.S. Cl.
CPC ............. *G09B 7/04* (2013.01); *G09B 5/00* (2013.01); *G09B 7/08* (2013.01); *G09B 7/00* (2013.01); *G09B 7/02* (2013.01); *G09B 17/003* (2013.01); *G09B 19/00* (2013.01)

(58) Field of Classification Search
CPC ... G09B 7/00; G09B 7/02; G09B 7/04; G09B 5/00; G09B 7/08; Y10S 706/927; G06F 17/18
USPC .................................. 434/352, 350, 323, 365
See application file for complete search history.

(56) References Cited

U.S. PATENT DOCUMENTS

| | | | |
|---|---|---|---|
| 6,213,956 | B1 | 4/2001 | Lawton |
| 6,301,571 | B1 | 10/2001 | Tatsuoka |

(Continued)

OTHER PUBLICATIONS

S.A. Miller, "What does it mean to curve grades?", May 2009, https://web.archive.org/web/20100101000000*/http://academics.hamilton.edu/biology/smiller/curve.html, p. 1-3.*

(Continued)

*Primary Examiner* — Jack Yip
(74) *Attorney, Agent, or Firm* — Kilpatrick Townsend & Stockton LLP

(57) ABSTRACT

A method/apparatus/system for educational intervention based on a response metric is disclosed. The notice is generated in response to the collection of user and question data, the sending of questions, the receipt of answers, the evaluation of the correctness of the answers, the generation of a response metric, the comparison of the response metric to a threshold, and the generation of the report or notice. The response metric can be reflect the scatter, randomness, and/or slope of student provided answer data, and can be a fractal dimension.

20 Claims, 11 Drawing Sheets

Related U.S. Application Data continuation of application No. 13/726,492, filed on Dec. 24, 2012, now Pat. No. 8,755,737.

(51) Int. Cl.
  *G09B 19/00* (2006.01)
  *G09B 7/00* (2006.01)

(56) References Cited

U.S. PATENT DOCUMENTS

| | | |
|---|---|---|
| 6,418,298 B1 | 7/2002 | Sonnenfeld |
| 7,293,025 B1 | 11/2007 | Harouche |
| 7,895,072 B1 | 2/2011 | Manzi et al. |
| 8,086,483 B1 | 12/2011 | Yuan et al. |
| 8,755,737 B1 | 6/2014 | Galen et al. |
| 9,483,955 B2 | 11/2016 | Galen et al. |
| 2002/0169822 A1 | 11/2002 | Packard et al. |
| 2003/0129574 A1 | 7/2003 | Ferriol et al. |
| 2005/0106540 A1 | 5/2005 | Wasowicz et al. |
| 2005/0123893 A1 | 6/2005 | Stout et al. |
| 2005/0191610 A1 | 9/2005 | Berger et al. |
| 2005/0277099 A1 | 12/2005 | Van Schaack et al. |
| 2006/0127871 A1 | 6/2006 | Grayson |
| 2006/0183099 A1 | 8/2006 | Feely et al. |
| 2007/0178432 A1* | 8/2007 | Davis .................. G09B 7/02 434/353 |
| 2007/0231780 A1 | 10/2007 | Shulman |
| 2009/0035733 A1 | 2/2009 | Meitar et al. |
| 2009/0197235 A1 | 8/2009 | Tormey et al. |
| 2009/0288150 A1 | 11/2009 | Toomim et al. |
| 2009/0325140 A1 | 12/2009 | Gray et al. |
| 2010/0055662 A1 | 3/2010 | Betebenner |
| 2011/0189647 A1 | 8/2011 | Radtke et al. |
| 2011/0244434 A1 | 10/2011 | Livne et al. |
| 2012/0244510 A1 | 9/2012 | Watkins, Jr. |
| 2013/0096892 A1 | 4/2013 | Essa et al. |

OTHER PUBLICATIONS

Gneiting et al., "Estimators of Fractal Dimension: Assessing the Roughness of Time Series and Spatial Data," Dec. 21, 2010, University of Washington, Department of Statistics, pp. 1-38.

\* cited by examiner

FRACTAL-BASED DECISION ENGINE FOR INTERVENTION

CROSS-REFERENCES TO RELATED APPLICATIONS

This patent application is a continuation of U.S. patent application Ser. No. 14/302,822, filed Jun. 12, 2014 and entitled "FRACTAL-BASED DECISION ENGINE FOR INTERVENTION", which is a continuation of U.S. patent application Ser. No. 13/726,492, filed Dec. 24, 2012, now U.S. Pat. No. 8,755,737, issued on Jun. 17, 2014 and entitled "FRACTAL-BASED DECISION ENGINE FOR INTERVENTION," the entirety of each of which is hereby incorporated by reference herein.

BACKGROUND OF THE INVENTION

This disclosure relates in general to Learning Management Systems (LMS) and/or Online Homework Systems (OHS) and, but not by way of limitation, to assisting students using the LMS and/or OHS.

Student comprehension evaluation can facilitate providing students with required learning resources. In such evaluation, a student receives a task including one or several questions/prompts. In response to these questions/prompts, a student provides answers. These answers are evaluated to determine the number of questions/prompts that the student correctly answered, which then, results in a grade or a score for the task.

In more advanced learning environments, a student can interact with an LMS to receive educational training. The LMS can provide the student with tasks and can determine a score indicating the number of questions/prompts that the student correctly answered. These evaluation procedures do not provide reliable detection and reliable early detection of student comprehension and thus do not meet the needs of educators or students. Currently, these lacking evaluation procedures used in the LMS results in lost opportunity.

BRIEF SUMMARY OF THE INVENTION

In one embodiment, the present disclosure provides a learning system including user devices, databases, and a managed learning environment, each of which are connected via a network. The learning system collects question and user data and generates a questionnaire based on the collected data. This questionnaire is provided to the student, and in response, answers to the questions are submitted by the student. The learning system determines which of the student provided answers are correct and applies a boolean-value to an answer based on whether the student correctly answered the question. This process is repeated for a plurality of the answered questions. The boolean-values, and/or a sum of the boolean-values are used to generate a response metric that can reflect the scatter, randomness, and/or slope of the boolean-values and/or the sum of the boolean-values associated with the student provided answers. The response metric is compared to a threshold, which can trigger the generation of a notice.

In another embodiment, the present disclosure provides a method for detecting a threshold of scatter or randomness in questionnaire answer data. The method can include the generation of a questionnaire, storing answers to the questions in the questionnaire, providing the questionnaire to a student, receiving answers from the student, determining whether the questionnaire answers are correct or incorrect according to a boolean-valued function, applying a boolean-value to the questions according to whether they are correctly or incorrectly answered, generating a response metric based on the applied boolean values, comparing a response metric to a threshold, and providing a notice reporting whether the student surpassed the threshold.

In another embodiment, the present disclosure provides a method for determining and reacting to questionnaire response patterns. Electronic data including questions and answers to the questions is stored. The questions are associated with a common topic. A user profile including data identifying a user and data relating to the user's past performance in answering questions is stored. Data defining a threshold value is stored. The threshold value is at least one of a value associated with the user, a value associated with the topic, and a generic value. Questionnaire answer data is received. The questionnaire answer data includes user provided answers to the questions. A user associated with the questionnaire answer data is determined. Questionnaire answer data is stored in an electronic store and it is determined whether the questionnaire answers are correct or incorrect according to a boolean-valued function. A boolean value indicating a correct answer for correct user provided answers is stored. A boolean value indicating an incorrect answer for incorrect user provided answers is stored. A function on the boolean-value outcome to generate a response metric indicative of the scatter or randomness of the questionnaire answer data is performed. An educator for the user and the common topic associated with the questions is determined, which educator supervises the user's work. The response metric indicative of the scatter or randomness of the questionnaire answer data with the data defining the threshold value is compared. A message to an educator identifying the user, the topic, and that the threshold value has been reached is sent. Data is stored in the user's user profile identifying the topic and indicating that the threshold value has been reached.

In another embodiment, the present disclosure provides a learning system for determining and reacting to questionnaire response patterns. The learning system includes one or more hardware servers that are programmed to execute instructions. The one or more hardware servers are programmed to store electronic data comprising questions and answers to the questions. The questions are associated with a common topic. The one or more hardware servers are programmed to store a user profile comprising data identifying a user and data relating to the user's past performance in answering questions, and are programmed to store data defining a threshold value that can include at least one of a value associated with the user, a value associated with the topic; and a generic value. The one or more hardware servers are programmed to receive questionnaire answer data. The questionnaire answer data includes user provided answers to the questions. The one or more hardware servers are programmed to determine a user associated with the questionnaire answer data, and are programmed to store the questionnaire answer data in an electronic store. The one or more hardware servers are programmed to determine whether the questionnaire answers are correct or incorrect according to a boolean-valued function, to store a boolean value indicating a correct answer for correct user provided answers, and to store a boolean value indicating an incorrect answer for incorrect user provided answers. The one or more hardware servers are programmed to perform a function on the boolean-value outcome to generate a response metric indicative of the scatter or randomness of the questionnaire answer data. The one or more hardware servers are programmed to determine an educator for the user and the common topic associated with the questions, which educator supervises the user's work. The one or more hardware servers are programmed to compare the response metric indicative of the scatter or randomness of the questionnaire answer data with the data defining the threshold value, to send a message to an educator identifying the user, the topic, and that the threshold value has been reached, and to store data in the user's user profile identifying the topic and indicating that the threshold value has been reached.

In another embodiment, the present disclosure provides a method for generating a report in response to determining to questionnaire response patterns. Question data is received, which question data includes questions, answers associated with the questions, and a topic associated with the questions. User data is received, which user data includes user identification and user performance history. The user performance history indicates the number of questions that the user has received and the number of questions that the user has correctly answered. A questionnaire is created based on the question data. The questionnaire is sent. Answer data is received, which answer data includes submitted responses to the questions in the questionnaire. The correctness of the answers is determined according to a boolean-valued function. The correct answers are assigned a first boolean-value and incorrect answers are assigned a second boolean-value. A response metric based on the boolean-values assigned to the answers is generated. The response metric provides an indicator of the degree of randomness in the answers. The submitted responses are evaluated based on the response metric. Data indicating degree of randomness in the answers is stored. A report of the results of the evaluation is generated. The generating of the report includes identifying the recipients of the report; and determining the user associated with the report. The report is sent to the identified recipients.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
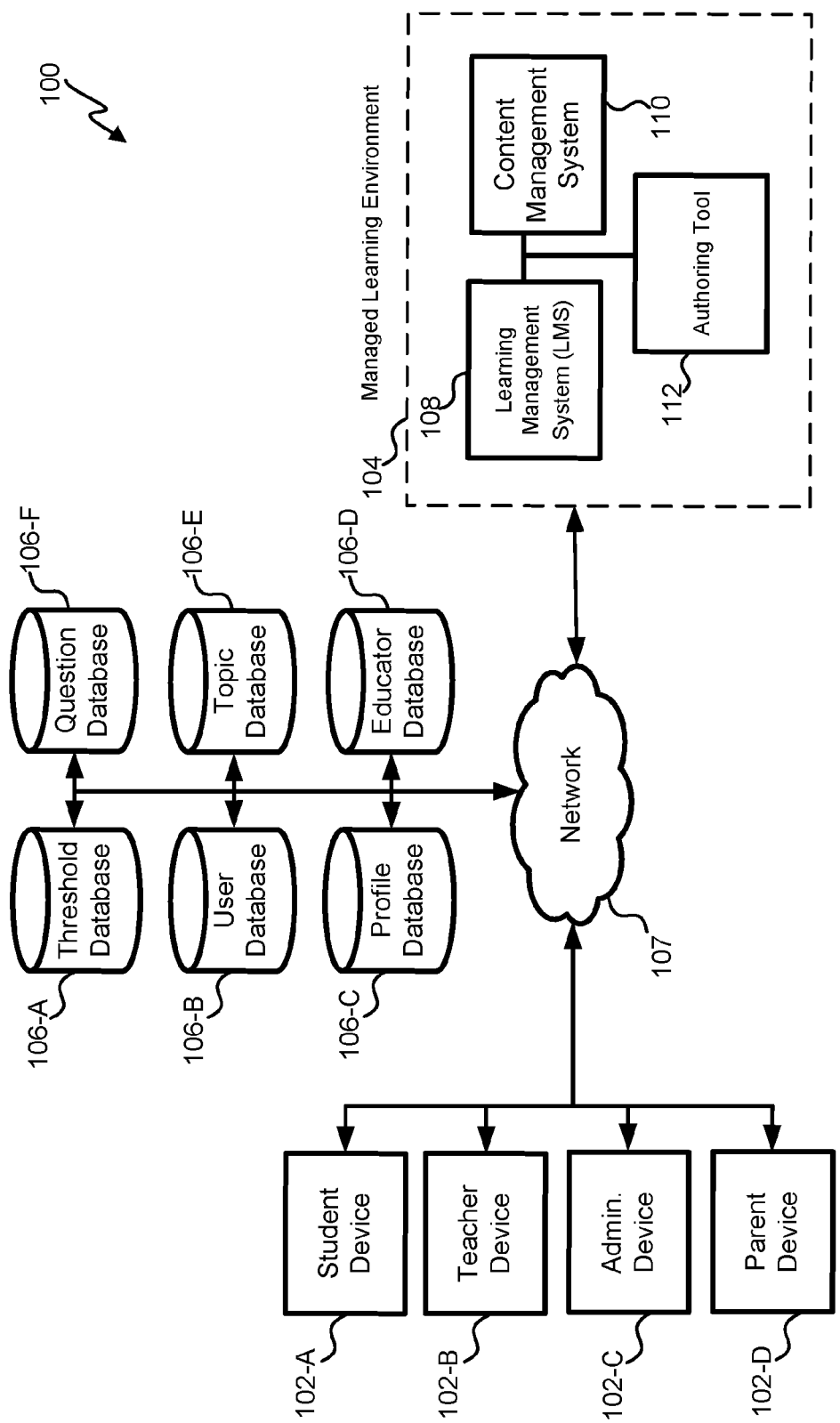
FIG. 1 depicts a block diagram of an embodiment of a learning system.

Referring first to FIG. 1, a block diagram of an embodiment of a learning system 100 is shown. The learning system facilitates 100 learning by combining educational and student resources within a flexible system that can facilitate instruction and evaluation of learning. The learning system 100 includes user devices 102, a managed learning environment 104, and databases 106 that are connected, such as by a network 107, to send and receive information to provide educational services to a student.

The user devices 102 includes a student device 102-A, a teacher device 102-B, an administrator device 102-C, and a parent device 102-D. The user devices 102 allow a user, including a student, a parent, and an educator, including a teacher and an administrator, to access the learning system 100. This access can be in the form of a student receiving educational material from the learning system 100, a student receiving a questionnaire having one or several questions from the learning system 100, a student providing answers to a learning system 100, a student, teacher, administrator, or parent receiving messages from the learning system 100, a teacher selecting material for the student in the learning system 100, the creation of educational material, the receipt of information indicating a teacher's educational performance, the receipt of a class progress report, providing information to the learning system 100, receiving information from the learning system 100, or any other similar activities. The details and function of the user devices 102 will be discussed at greater length in reference to FIG. 2 below.

The managed learning environment 104 is a collection of education resources, tools, and software that can be accessed via the learning system 100. The managed learning environment 104 facilitates and manages the education process by, for example, setting the parameters of a learning experience and the standardization of learning resources. The managed learning environment 104 includes a variety of components such as a learning management system (LMS) 108, a content management system 110, and an authoring tool 112. Although the managed learning environment 104 is depicted as including each of the above listed components, the managed learning environment 104 may include more or fewer components than those depicted. Additionally, some or all of these depicted components can be located as capabilities and/or subcomponents within the other depicted components. In some embodiments, the learning system 100 can include an Online Homework System (OHS) instead of, in addition to, or as a component of the managed learning environment 104, and can, like the managed learning environment 104, facilitate and manage the education process by, for example, setting the parameters of a learning experience and the standardization of learning resources.

The LMS 108, and similar educational components such as a virtual learning environment (VLE) and a learning content management system (LCMS), provides for some or all of the administration, documentation, tracking, reporting, and delivery of education courses or training programs. The LMS 108 facilitates education by allowing the use of self-service and self-guided educational services so as to allow a student to progress at their own selected pace and to access material as desired. The LMS 108 also facilitates the personalization of content to the student and enables knowledge reuse. The LMS is accessible by a user device 102 that is connected to the learning system 100 and having the requisite permission for such access. In some embodiments, the managed learning environment 104 can include the OHS instead of, in addition to, or as a component of the LMS 108. In such an embodiment, the OHS can allow a user to access online material including education and assessment resources such as, for example, lessons, assignments, homework, tests, quizzes, or questions.

The content management system 110 allows the publishing, editing, and modifying of content within the managed learning environment 104. The content management system 110 also provides procedures to manage the workflow within the managed learning environment 104. The content management system 110 provides the education content to the LMS 108, which content is delivered to the student or user by the LMS 108.

The authoring tool 112 allows the creation of content for use in the managed learning environment 104 and the creation of submissions by the students. The content and/or submissions created by the authoring tool 112 can be transmitted to the LMS 108 for use as part of an educational course or training program, or for evaluation.

The databases 106 store information for use in the learning system 100. The databases 106 can be accessed by the user devices 102, by the managed learning environment 104, by the components of the managed learning environment 104, or by some or all of the other databases 106. The databases 106 can include, for example, a threshold database 106-A, a user database 106-B, a profile database 106-C, an educator database 106-D, a topic database 106-E, and a question database 106-F. In some embodiments, the content of the databases 106 can be combined or divided in the same way or in a different way than depicted.

The threshold database 106-A stores information relating to a threshold. The threshold is an indicator of student performance, and can, for example, indicate the level of student performance such as excellent performance, satisfactory performance, unsatisfactory performance, or any other desired performance level. The threshold can be a single threshold, or a plurality of thresholds. The threshold can be a generic, default threshold common to the learning system 100, the managed learning environment 104, or the LMS 108, or the threshold can be customized to a teacher, a program, a class, a grade level, an age, a student, an aspect of one or several student profiles, a topic, or any other desired metric.

The user database 106-B stores information relating to the users. This information can include the name of the user, a username, a password, or any other user identification information. This information can be provided the users, including, for example, the student, the educator, or the parent.

The profile database 106-C stores user profiles. The user profiles can be created by the users, or can be created based on the actions of the user within the managed learning environment 104. The stored user profiles can include information relating to education that the user has received, past or current user performance, past, present, or future user courses, past, present, or future user teachers, past, present, or future user administrators, user parents, user preferences, any user disability, or any other user characteristic.

The educator database 106-D stores educator information, such as an educator profile. The educator profile can identify an educator, an educator's past, current, or future course schedule, topics and/or courses taught by an educator, educator evaluation information such as, for example, past or current student or class results, educator preferences, or other similar information.

The topic database 106-E can include topic information. This can include the educational information relating to a subject matter, a course, a topic, or a division thereof. In some embodiments, the topic database 106-E can include information dividing a subject matter into courses, dividing the courses into topics, and further dividing the topics into subtopics. This division of the subject matter into smaller units can be continued until the units have reached a desired size, such as, for example, the size of a single lecture or portion thereof.

The question database 106-F can include question and associated answer information. The questions can correspond to and be associated with information stored in the topic database 106-E, and can thus relate to a subject matter, a course, a topic, or a division thereof. The questions can likewise correspond to and be associated with information stored in the educator database 106-D such as, for example, the teacher assigning the questions to the student or the administrator responsible for supervising the teacher. The questions can also be associated with an answer so that responses received to the questions from students can be evaluated for accuracy.

An educator may access the learning system 100 via the teacher and/or administrator device 102-B, and the educator may access information stored in one or several of the databases 106. The educator may use this information in connection with a component of the managed learning system 104 to view, create, modify, or evaluate educational material or student work product. Any changes to the educational material made by the educator may be stored in one or several of the databases 106.

A student may access the learning system 100 via the student device 102-A, and the student accesses educational information or student work product stored in one or several of the databases 106 via the managed learning environment 104. Any changes and/or progress made the student are tracked by the managed learning environment 104 and stored in one or several of the databases 106.

The student work product and/or any student progress is evaluated by a component of the managed learning environment 104 or by an educator. The student's progress and/or evaluation is tracked by the managed learning environment 104 and is stored in one or several of the databases 106. The student's progress and/or evaluation is reported to the student, to an educator such as a teacher or an administrator, or to a parent.

Figure 2:
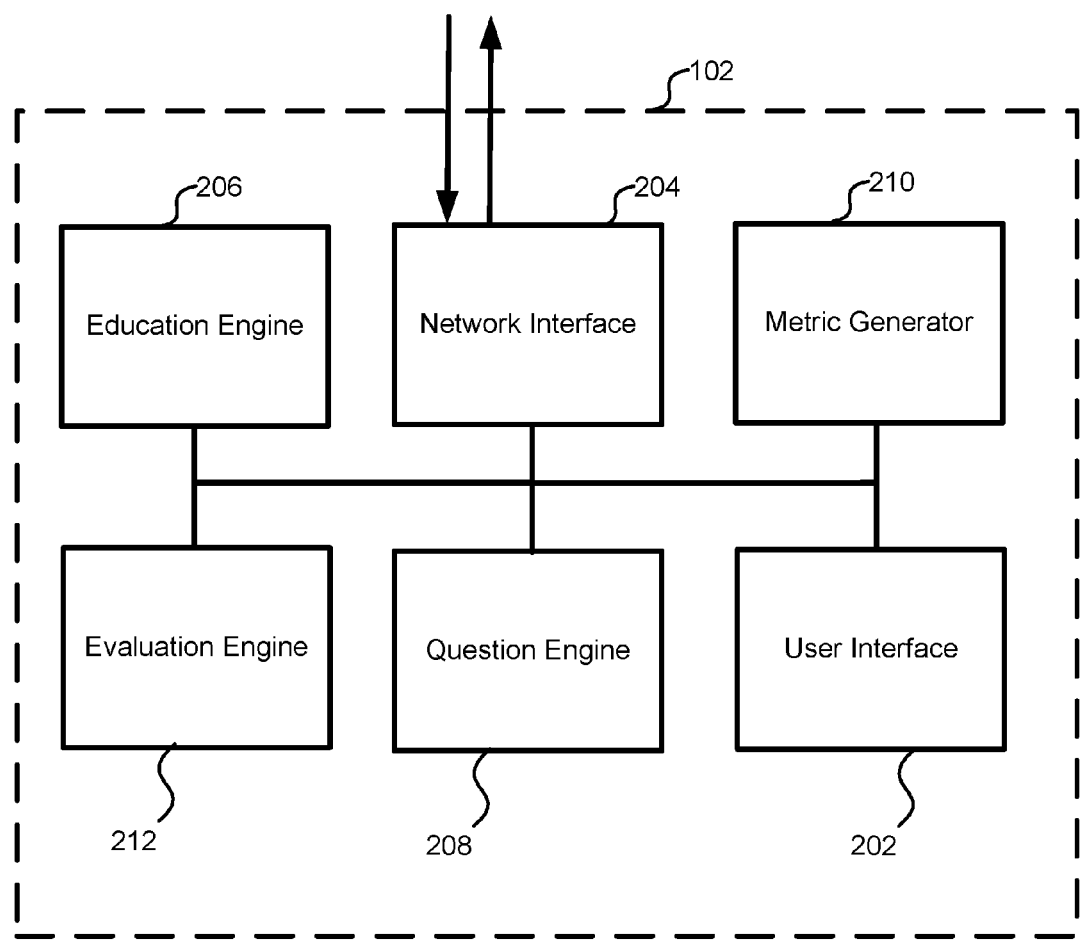
FIG. 2 depicts a block diagram of an embodiment of a learning device.

With reference to FIG. 2, a block diagram of an embodiment of the user device 102 is shown. As discussed above, the user device 102 can be used to access the learning system 100. Specifically, the user device 102 can be used to access the LMS 108. In some embodiments, the user device 102 accesses the LMS 108 via the network 107. In some embodiments, some or all of the components of the LMS 108 can be located on the user device 102.

The user device 102 includes a user interface 202 that communicates information to, and receives inputs from a user. The user interface 202 can include a screen, a speaker, a monitor, a keyboard, a microphone, a mouse, a touchpad, a keypad, or any other feature or features that can receive inputs from a user and provide information to a user.

The user device 102 includes a network interface. The network interface 204 communicates with other components of the learning system 100. In some embodiments, the network interface 204 sends signals to and receive signals from other components of the learning system 100 by, for example, the network 107. The network interface 204 can communicate via telephone, cable, fiber-optic, or any other wired communication network. In some embodiments, the network interface 204 can communicate via cellular networks, WLAN networks, or any other wireless network.

The user device 102 includes and education engine 206. The education engine 206 allows the user to access the managed learning environment 104 and can include components to allow a user to receive, create, and/or edit educational material. The education engine 206 can be software located on the user device 102, or a portal, such as a web portal, accessible via the user device 102.

The user device 102 includes a question engine 208. The question engine 208 allows the user to receive and access questions associated with educational material, and to provide answers to the received questions. The question engine 208 can include encryption and decryption components to allow the secure transmission of the questions. The question engine 208 can further include features to track a student responding to questions. This tracking can include, for example, gathering of information relating to time spent on some or all of the questions or information relating to circumstances in which the questions were received, such as, for example, time of day, month, location, or conditions existing at the location. The question engine 208 can be software located on the user device 102, or a portal, such as a web portal, accessible via the user device 102.

The user device 102 includes a response metric generator 210. The metric generator 210 collects user provided answers and generates a response metric. This response metric is based on the number of correct answers provided by the user and/or the number of incorrect answers provided by the user. The details of the generation of the response metric will be discussed at greater length below. The metric generator 210 can be software located on the user device 102, or a portal, such as a web portal, accessible via the user device 102. The metric generator 210 can also be located on another component of the learning system 100 such as, for example, the managed learning environment, and accessible by the user device 102.

The user device 102 includes an evaluation engine 212. The evaluation can provide an evaluation of one or several user results, including, an evaluation of one or several student results, of the results of a class, or of an educator's effectiveness.

The evaluation engine 212 receives score information from the score generator 210 and evaluates the user provided answers based on the score. In some embodiments, this evaluation can include comparing the score information with one or several threshold values to determine the level of performance. In some embodiments in which the score is associated with a single student's answers, the evaluation engine 212 can evaluate the student's performance in answering the questions. In some embodiments in which the score information is associated with a class, the evaluation engine 212 can evaluate the class's performance in answering questions.

In some embodiments, information relating to a student's performance or a class's performance can be used by the evaluation engine to evaluate an educator, such as, for example, a teacher. In such an embodiment, the evaluation of the educator can be based, for example, on a comparison of the progress of the educator's students compared to other groups of students or other metrics.

The evaluation engine 212 can receive information from the question engine 212 and/or education engine 206 relating to the educator, subject matter, course work, topics, or subtopics associated with the questions. The evaluation engine 212 can further receive information from the question engine relating to circumstances in which the questions were received, such as, for example, time of day, month, location, or conditions existing at the location. Based on the received information, the evaluation engine 212 applies one or several threshold values to the score to determine the user's proficiency in the subject matter, course work, topics, or subtopics associated with the questions. The evaluation engine 212 can generate a report indicating the user's proficiency and can provide this report to the network interface for communication to other components of the learning system.

The evaluation engine 212 can be software located on the user device 102, or a portal, such as a web portal, accessible via the user device 102. The evaluation engine 212 can also be located on another component of the learning system 100 such as, for example, the managed learning environment, and accessible by the user device 102.

Figure 3:
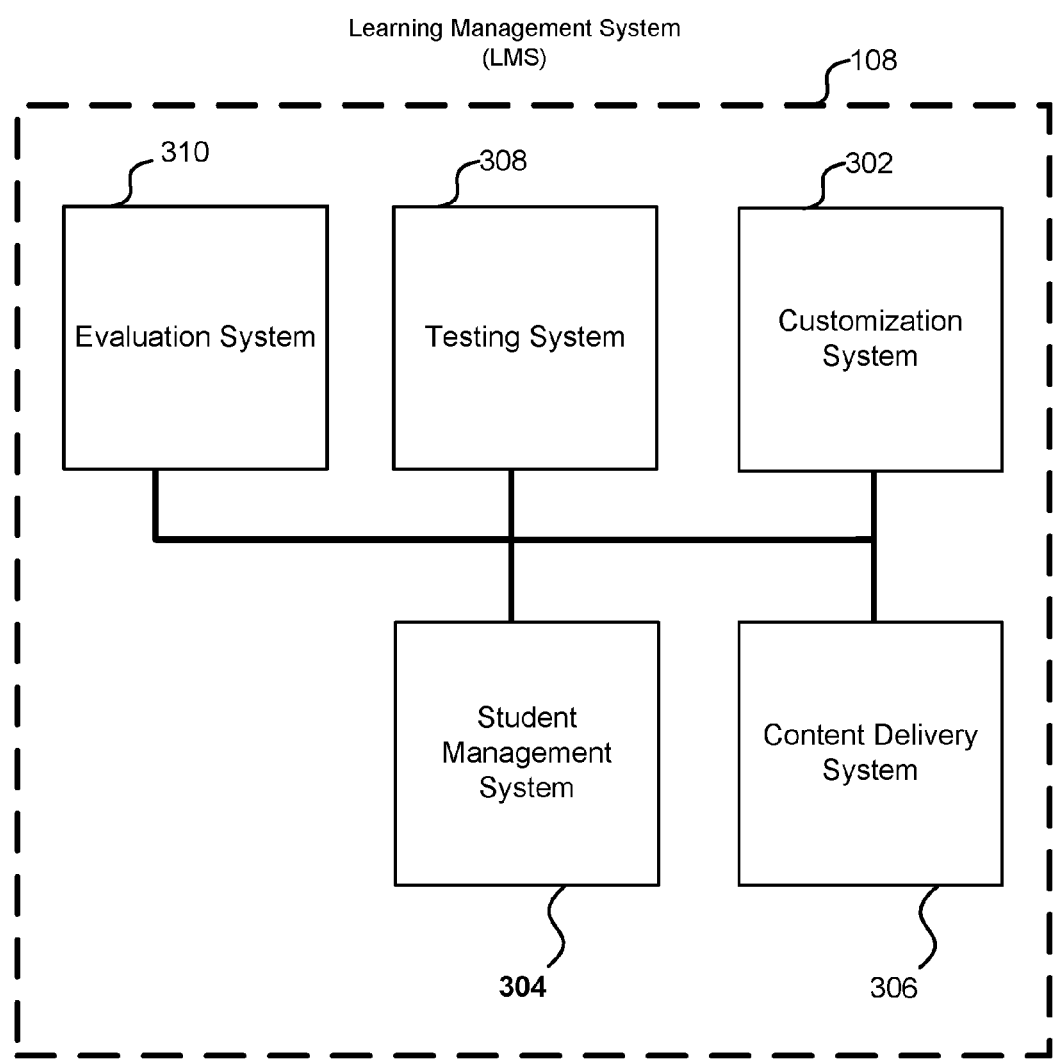
FIG. 3 illustrates a block diagram of an embodiment of a LMS.

With reference to FIG. 3, a block diagram of an embodiment of the LMS 108 is shown. As discussed above, the LMS 108 facilitates education by allowing the use of self-service and self-guided educational services so as to allow a student to progress at their own selected pace and to review material as desired The LMS 108 includes a customization system 302. The customization system 302 adjusts the educational experience to match the student's educational needs and desires. In some embodiments, the customization system 302 can query the profile database 106-C for student preferences, including learning preferences. The customization engine can additionally query the profile database 106-C for information relating to the student's past performance to identify potential areas of difficulty with new subject matter. In some embodiments, the customization engine can further query the educator database 106-D for educator input information relating to the student's needs. This information can be based on the educator's past experiences with the student and the strengths and weaknesses of the student. Based on the received information, the customization system 302 can modify the educational material for the student.

The LMS 108 includes a student management system 304. The student management system 304 can track the student's progress through a curriculum, including one or several courses or trainings and can query the profile database 106-C for information relating to the student's progress through the curriculum, including the student's educational goals, lessons that the student has completed, questions that the student has answered, and for results of the questions that the student has answered. The student management system 304 can additionally query the content management system 110 to identify additional educational information that the student can complete in order to complete the curriculum and can additionally query the educator database 106-D for educator inputs including the educator's educational goals for the student. Based on the received information, the student management system 304 can modify the curriculum to maximize the student's educational experience.

The LMS 108 includes a content delivery system 306. The content delivery system 306 provides content to the student device 102-A. The content delivery system 306 receives educational material from the content management system 110 and/or from the student management system 304 and provides the material to the student device 102-A in the appropriate format.

The LMS 108 includes a testing system 308 and an evaluation system 310. The testing system 308 queries the question database 106-F for questions and associated answers. After receiving the questions and associated answers, the testing system 308 can transform the questions into a testable format by, for example, associating a student's and/or educator's information with the questions or placing the questions in a page format. The testing system 308 can then provide the questions to the student.

The testing system 308 can additionally receive responses from the student and determine if the received responses are correct. In some embodiments, the testing system 308 determines if the received response are correct by querying the question database 106-F for answer data. The testing system 308 can then compare the user provided answers with the answer data and determine whether the student answers are correct. In some embodiments, this determination of the correctness of the student provided answers can be made according to a boolean-valued function. The testing system 308 can generate a boolean-value for all or some of the received answers. In some embodiments, a correct answer can be assigned a boolean-value of true, which can be represented by a value such as "1" and an incorrect answer can be assigned a boolean-value of false, which can be represented by a value such as "−1".

The evaluation system 310 receives the corrected answers from the testing system 308 and evaluates the answers for indicia of student comprehension. In some embodiments, the evaluation system 310 generates a response metric indicative of the scatter, randomness, and or slope of data associated with a student's answers. The process used by the evaluation system 310 to evaluate the answers will be discussed in greater detail below.

Figure 4:
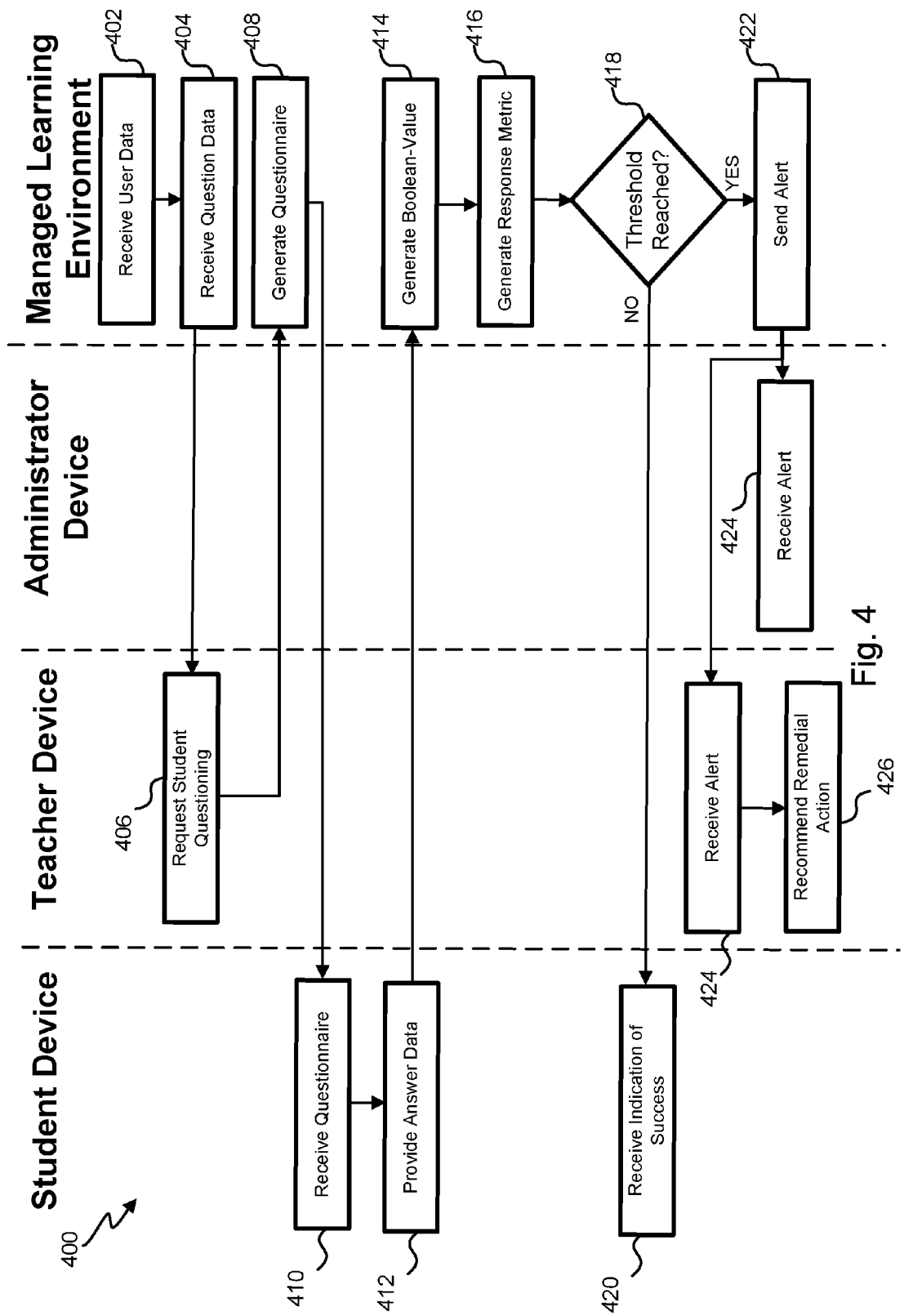
FIG. 4 illustrates a swimlane flowchart of an embodiment of a process for detecting a threshold of scatter or randomness in questionnaire answer data.

With reference now to FIG. 4, a swimlane flowchart of an embodiment of a process 400 for detecting a threshold of scatter or randomness in questionnaire answer data is shown. The headers of the swimlanes identify components of the learning system 100 that can perform and indicated step.

The process 400 begins at block 400, wherein the managed learning environment 104 receives the user data. The user data can be received from the profile database 106-C and/or the educator database 106-D and can be received by the customization system 302 and/or the student management system 304.

In some embodiments, the user data can include student data, such as, the student profile, including student preferences or student education and/or performance history. In some embodiments, the user data can include the educator profile, including, educator preferences or educator performance history.

After receiving the user data, the process 400 proceeds to block 404, wherein the question data is received. The question data can be received from the question database 106-F and can be received by the managed learning environment 104 and specifically by the testing system 308. The question data can include one or several questions relating to one or several topics, and answers to the received questions.

After receiving the question data, the process 400 proceeds to block 406 wherein the educator, for example via the teacher device 102-B, requests questioning for the student. In some embodiments, this request can be made in response to a prompt by the student management system 304 or in some embodiments the request can be made by the student management system 304.

After the request has been made, the process 400 proceeds to block 408 wherein the questionnaire is generated. The questionnaire includes at least one question and requests a student response to that question. The questionnaire can be, for example, an assignment, a quiz, or a test. In some embodiments, the questionnaire can be a preexisting questionnaire, in which case, the generation of the questionnaire can include querying the question database 106-F for the completed questionnaire. In some embodiments, the questionnaire can be generated by the testing system 308 of the LMS 108. The testing system 308 queries the question database 106-F for questions and associated answers to provide to the student. In some embodiments, the requested questions and answers are associated with one or several subject matters and/or topics. The testing system 308 compiles the requested questions and answers into a questionnaire.

After the questionnaire has been generated, the process 400 proceeds to block 410 and the testing system 308 of the LMS 108 sends the questionnaire via the network 107 to the student device 102-A, wherein the questionnaire is received.

After the questionnaire has been received, the student provides answer data. In some embodiments, the user can provide answer data to the student device 102-A via the user interface 202 of the student device 102-A. In some embodiments, the student can provide the answer data to the teacher in a non-digital form, such as, for example, by writing the answers, by completing a multiple choice answer sheet, or orally. In such embodiments, the educator can enter the answer data into the learning system 100 via the teacher device 102-B or administrator device 102-C. In some embodiments, a student may be allowed to answer a question multiple times, receiving feedback after each answer indicating whether the question is correctly answered, until the question is correctly answered. The answer data is sent from the network interface 204 of the user device 102 to the managed learning system 104 via the network 107.

After the answer data is provided, the process 400 proceeds to block 414, wherein a boolean-value is generated for each answer. In embodiments in which the student is allowed to answer a question multiple times until the question is correctly answered, the boolean-value may be generated for some of the submitted answers, such as, for example, the first answer submitted by the student in response to the question, called a first submitted answer, or for all of the submitted answers. The boolean-value corresponds to the correctness of the answer provided by the student. Thus, a correct answer can be assigned a boolean-value of true, which can, in some embodiments be represented by "1", and an incorrect answer can be assigned a boolean-value of false, which can, in some embodiments, be represented by "−1". The boolean-value can be generated by the testing system 308.

After the boolean-value has been generated, the process 400 proceeds to block 416 wherein a response metric is generated. The response metric is generated, in part, based on the generated boolean-values. In some embodiments, in which the assigned boolean-values are a "1" for a correct answer and a "−1" for an incorrect answer, the response metric can be based on the boolean-values and/or on the sum of the boolean-values. The response metric can be generated by the evaluation system 310 of the managed learning environment 104, and in some embodiments, response metric score can be generated by the score generator 210. The generation of the response metric will be discussed in greater detail below.

After the response metric has been generated, the process 400 proceeds to decision state 418 wherein the learning system 100 determines whether the threshold is reached. In some embodiments, the determination of whether the threshold is reached is made by the evaluation engine 212 of the user device 102 or by the evaluation system 310 of the LMS 108 of the managed learning system 104.

If the threshold is not reached and the student has demonstrated an adequate level of comprehension of the topic(s) associated with the questions, and the process proceeds to block 420 wherein the student receives an indication of success. In some embodiments, the indication of success can be sent to, for example, at least one of the student device 102-A, the teacher device 102-B, the administrator device 102-C, and/or the parent device 102-D. The indication of success can be sent via the network 10 and can be received by the network interface 204.

If the threshold is reached and the student has demonstrated an insufficient level of comprehension, the process 400 proceeds to block 422 and the managed learning environment 104 sends an alert that is received at blocks 424 by the one or several user devices 102 at block 422. The alert can include information identifying the student, identifying the questions that led to the alert, and/or identify the topic associated with the questions.

In some embodiments, the alert can be sent via the network 107 and received by the network interface 204 of one or more of the user devices 102. In some embodiments, the user device 102 receiving the alert can provide the alert to the user and, in some embodiments, request a user input in response to the alert, such as, for example, a confirmation of receipt.

After the alert is received, the process 400 proceeds to block 426, wherein remedial action is recommended. In some embodiments, the alert can trigger the student management system 304 of the LMS 108, which can then request remedial action, and in some embodiments, the alert can result in the educator requesting remedial action. In some embodiments, information received with the alert can be used to identify one or several topics in which the student's comprehension level can be increased. These topics can then form the basis of the requested remedial action.

Figure 5:
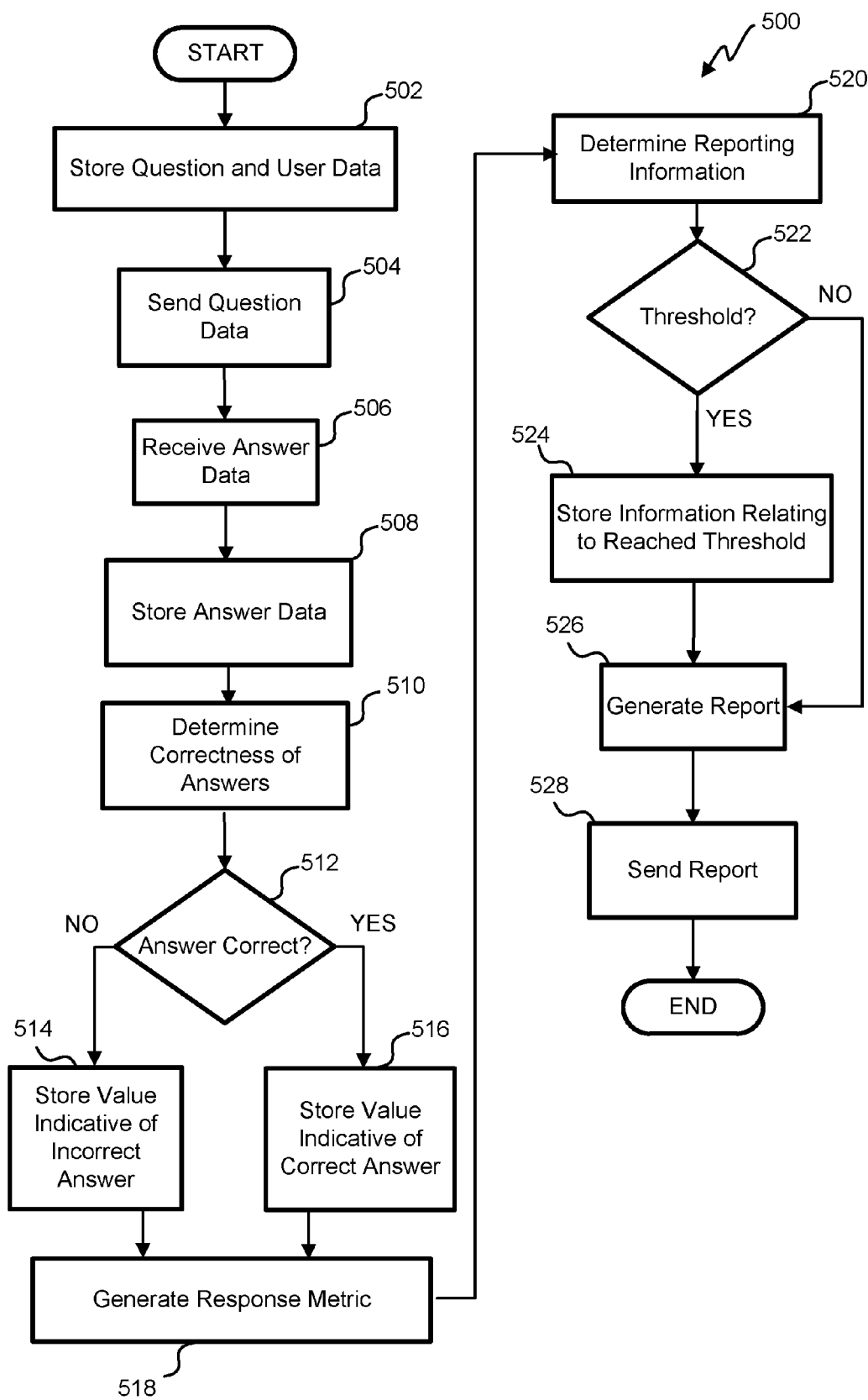
FIG. 5 illustrates a flowchart of an embodiment of a process for detecting a threshold of scatter or randomness in questionnaire answer data.

With reference now to FIG. 5, a flowchart of an embodiment of a process 500 for detecting a threshold of scatter or randomness in questionnaire answer data is shown.

The process 500 begins at block 502 wherein the databases 106 store question and user data. In some embodiments, the question data, including the questions and answers associated with those questions can be generated by an educator using the authoring tool 112 and can be sent to the databases 106, and specifically to the question database 106-F via the network. The questions and answers associated with the questions can then be stored in the databases 106.

In some embodiments, the questions and answers associated with those answers can be uploaded to the learning system 100 via one of the user devices 102 or via the managed learning environment 104 and can be sent to the databases 106, and specifically to the question database 106-F via the network. The questions and answers associated with the questions can then be stored in the databases 106.

The user data can include student data, educator data, and parent data. The user data can be submitted from one of the user devices 102 or can be generated based on a specific user's actions within the learning system 100. The user data can include past, current, and future courses, past testing results, preferences, past evaluations, and/or educational goals. The user information, whether submitted from a user device 102 or generated by the learning system can be stored in one or both of the profile database 106-C and the educator database 106-D.

After the question and user data is stored, the process 500 proceeds to block 504 wherein question data is sent. The question data is retrieved from the question database 106-F. After the question data is retrieved, the testing system 308 can transform the questions into a testable format and the testing system 308. The questions can then be sent from the testing system 308 within the LMS 108 via the network 107 to the desired user device 102, including, for example, the student device 102-A, the teacher device 102-B, and/or the administrator device 102-C.

After the question data is sent, the process 500 proceeds to block 506 wherein answer data is received. In some embodiments, the answer data is received, via the network 107, by the managed learning environment 104, by the LMS 108, and/or by the testing system 308. The answer data can be sent from a user device 102, such as the student device 102-A, the teacher device 102-B, and/or the administrator device 102-C. In some embodiments, the answer data can be created on the user device 102 by use of the authoring tool 112 and/or by use of the question engine 208.

After the answer data is received, the process 500 proceeds to block 508 wherein the answer data is stored. The answer data is stored in the databases 106, and can be particularly stored in the question database 106-F.

After the answer is stored, the process 500 proceeds to block 510 wherein the correctness of the answers is determined. In some embodiments, the correctness of the answer is determined by the testing system 308 comparing the answer received from the student with the question answer. In some embodiments, the testing system 308 can query the question database 106-F for the answer submitted by the student and for the answer to the question. The testing system 308 receives this information and then determines if the answer submitted by the student matches the answer to the question.

After the correctness of the answers is determined, the process 500 proceeds to decision state 512 wherein the received answers are sorted based on their correctness. This sorting is performed by the testing system 308. If the submitted answer is incorrect, a value indicative of the incorrectness of the submitted answer, such as, for example "−1", is associated with the answer, and the process 500 proceeds to block 514 wherein the value indicative of the incorrect answer is stored. Returning again to decision state 512, if the submitted answer is correct, a value indicative of the correctness of the submitted answer, such as, for example "1", is associated with the answer, and the process 500 proceeds to block 514 wherein the value indicative of the correct answer is stored. The value indicative of a correct or an incorrect answer can be sent from the managed learning environment 104, and specifically from the testing system 308 of the LMS 108 to the databases 106, and specifically to the question database 106-F.

After the answer has been stored, the process 500 proceeds to block 518 wherein a response metric is generated. The response metric represents the degree of scatter, roughness, and/or randomness in the values associated with the answers or the slope of the sum of the values associated with the answers. Thus, in embodiments in which the response metric corresponds with randomness, roughness, or scatter of the answers, such as if the student answers all of the questions correctly a low response metric would be generated. The response metric can be calculated by the evaluation system 310 and/or the testing system 308. In some embodiments in which aspects of the LMS 108 are operating on the user device 102, the response metric can be calculated by the score generator 210. The details of some embodiments of methods for the generation of the response metric will be discussed in greater detail below.

After the response metric has been generated, the process 500 proceeds to block 520 wherein reporting information is determined. The reporting information can include the evaluation of the student's performance, such as, for example, a traditional grade, a percentage of questions answered correctly, or a response metric, identification of the topic and/or subject matter of the questions, and/or identification of any parameters relating to the answering of the questions such as the time of day, the day of the week, the time of year, or the testing conditions. The reporting information can include information identifying an applicable threshold, and can additionally identify the intended recipients of the report. These recipients can include, for example, the student, an educator such as the teacher or an administrator, a parent, or any other desired information.

After the reporting information has been determined, the process 500 proceeds to decision state 522 wherein it is determined if the threshold has been reached. The determination of whether the threshold has been reached can be made by the evaluation system 310 or in embodiments in which components of the LMS 108 are located on the user device 102 the determination of whether the threshold has been reached can be made by the evaluation engine 212. The determination of whether the threshold has been reached can be made by comparing the response metric to the determined threshold.

If the threshold has been reached, the process 500 proceeds to block 524 wherein the information relating to the reached threshold is stored. The information relating to the reached threshold can be sent from the evaluation system 310 or from the evaluation engine 212 to the databases 106, and particularly to profile database 106-C for storage.

After the information relating to the reached threshold has been stored, or if it is determined in decision state 522 that the threshold has not been reached, the process 500 proceeds to block 526 wherein a report is generated. The report is generated by the evaluation system 310 or by the evaluation engine 212. The report can identify the student, educators associated with the student, the course or curriculum relating to the questions, the student's performance in answering the questions, and whether any remedial teaching or follow-up is required.

In some embodiments, the report can focus on a single student's performance, or on several students' performance. In some embodiments, the report can provide a teacher an overview of the performance of each of the students in her class, or an overview of the performance of the class. In some embodiments, the report can be a heat chart showing student performance distributions over the time of a course or training.

After the report has been generated, the process 50 proceeds to block 528 wherein the report is sent. The report can be sent to the users of the learning system 100 via the network 107. The report can be sent from the evaluation system 310 of the LMS 108 of from the evaluation engine 212 of the user device. The report can be sent to all designated recipients of the report.

Figure 6:
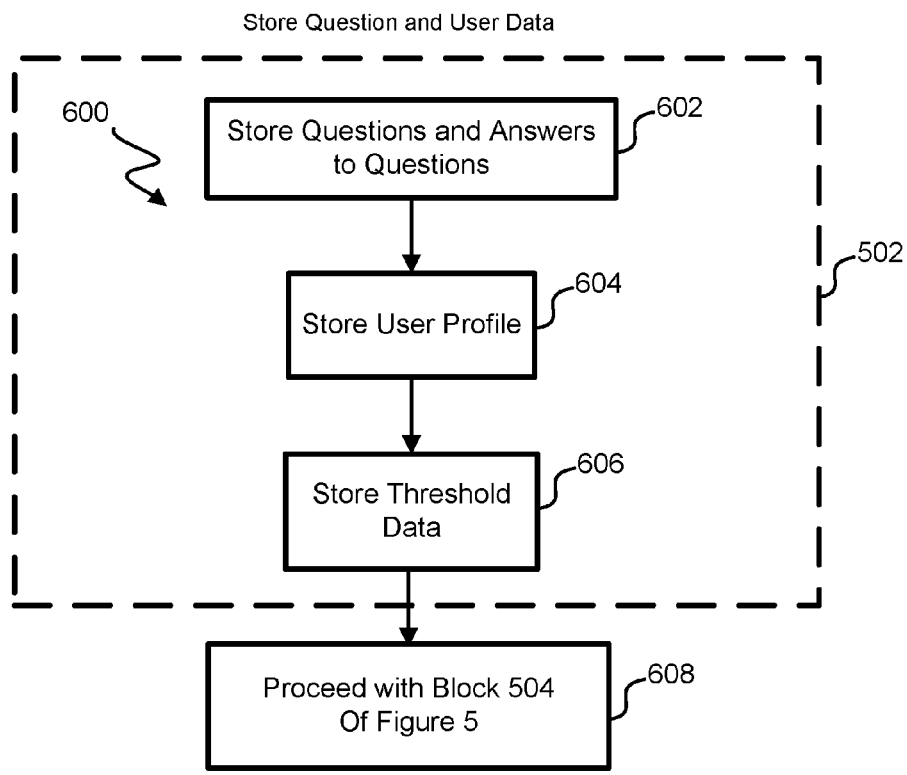
FIG. 6 illustrates a flowchart of an embodiment of a process for storing question and user data.

With reference to FIG. 6, a flowchart of an embodiment of a process 600 for storing question and user data is shown. The process 600 is a sub process performed in block 502 of FIG. 5, wherein the question and user data is stored. The process 600 begins in block 602 wherein the questions and answers to the questions are stored. As discussed above, the questions and answers to the questions can be generated with the authoring tool 112 or the questions and the answers to the questions can be uploaded to the learning system 100 via one of the user devices 102 or via the managed learning environment 104. The questions and the answers to the questions can be sent to the databases 106, and specifically to the question database 106-F via the network. The questions and answers associated with the questions can then be stored in the databases 106.

After the questions and answers to the questions are stored, the process 600 proceeds to step 604, wherein the user profile is stored. As discussed above, the user profile can be created by the user(s), or can be created based on the actions of the user within the managed learning environment 104. The stored user profiles can include information relating to education that the user has received, past or current user performance, past, present, or future user courses, past, present, or future user teachers, past, present, or future user administrators, user parents, user preferences, any user disability, or any other user characteristic. The use profile can be stored in the profile database 106-C.

After the user profile is stored, the process 600 proceeds to block 606, wherein the threshold data is stored. The threshold data can include data relating to a single threshold, or to a plurality of thresholds. The threshold can be a generic, default threshold common to the learning system 100, the managed learning environment 104, or the LMS 108, or the threshold can be customized to a teacher, a program, a class, a grade level, an age, a student, an aspect of one or several student profiles, a topic, or any other desired metric. The threshold can be set by a user such as a student, and educator such as a teacher or an administrator, or a parent, or be preset. The threshold data can be stored in the threshold database 106-A.

After the threshold data is stored, the process 600 proceeds to block 608, and then proceeds to block 504 of FIG. 5.

Figure 7:
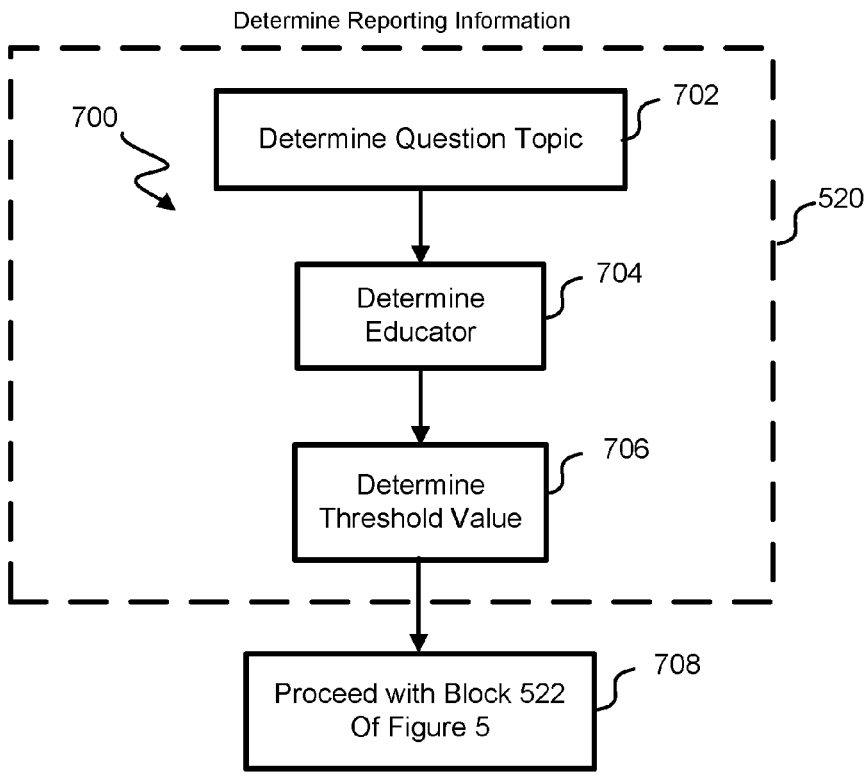
FIG. 7 illustrates a flowchart of an embodiment of a process for determining reporting information.

With reference now to FIG. 7, an embodiment of a process 700 for determining reporting information is shown. The process 700 is a sub process performed in block 520 of FIG. 5, wherein the reporting information is determined.

The process 700 begins at block 702 wherein the question topic is determined. The question topic can be determined by the managed learning environment 104, and specifically by the evaluation system 310 of the LMS 108. In embodiments in which components of the LMS are located on the user device 102 the question topic can be determined by the evaluation engine 212. The evaluation system 310 can query the databases 106, and specifically query the topic database 106-E and/or the question database 106-F for the information identifying the topic associated with the questions. The evaluation system 310 receives the information identifying the topic associated with the questions and thereby determines the question topic.

After the question topic is determined, the process 700 proceeds to block 704 wherein the educator is determined. The educator can be determined by the managed learning environment 104, and specifically by the evaluation system 310 of the LMS 108. In embodiments in which components of the LMS are located on the user device 102 the question topic can be determined by the evaluation engine 212. The evaluation system 310 can query the databases 106, and specifically query the educator database 106-D and the question database 106-F for information identifying the educator associated with the question. The evaluation system 310 receives the information identifying the educator associated with the question, and thereby determines the educator.

After the educator is determined, the process 700 proceeds to block 706 wherein the threshold value is determined. In some embodiments, the threshold value is determined by retrieving a threshold value that is stored in the threshold database 106-A. In some embodiments in which a single threshold value is stored in the threshold database 106-A, determining the threshold value is accomplished by selecting the single threshold value. In some embodiments in which multiple threshold values are stored in the threshold database 106-A, the determination of the threshold value can include the process of selecting one of the multiple threshold values. This process for selecting one of several threshold values is discussed in greater detail below.

After the threshold value is determined, the process 700 proceeds to block 708, and then proceeds to block 522 of FIG. 5.

Figure 8:
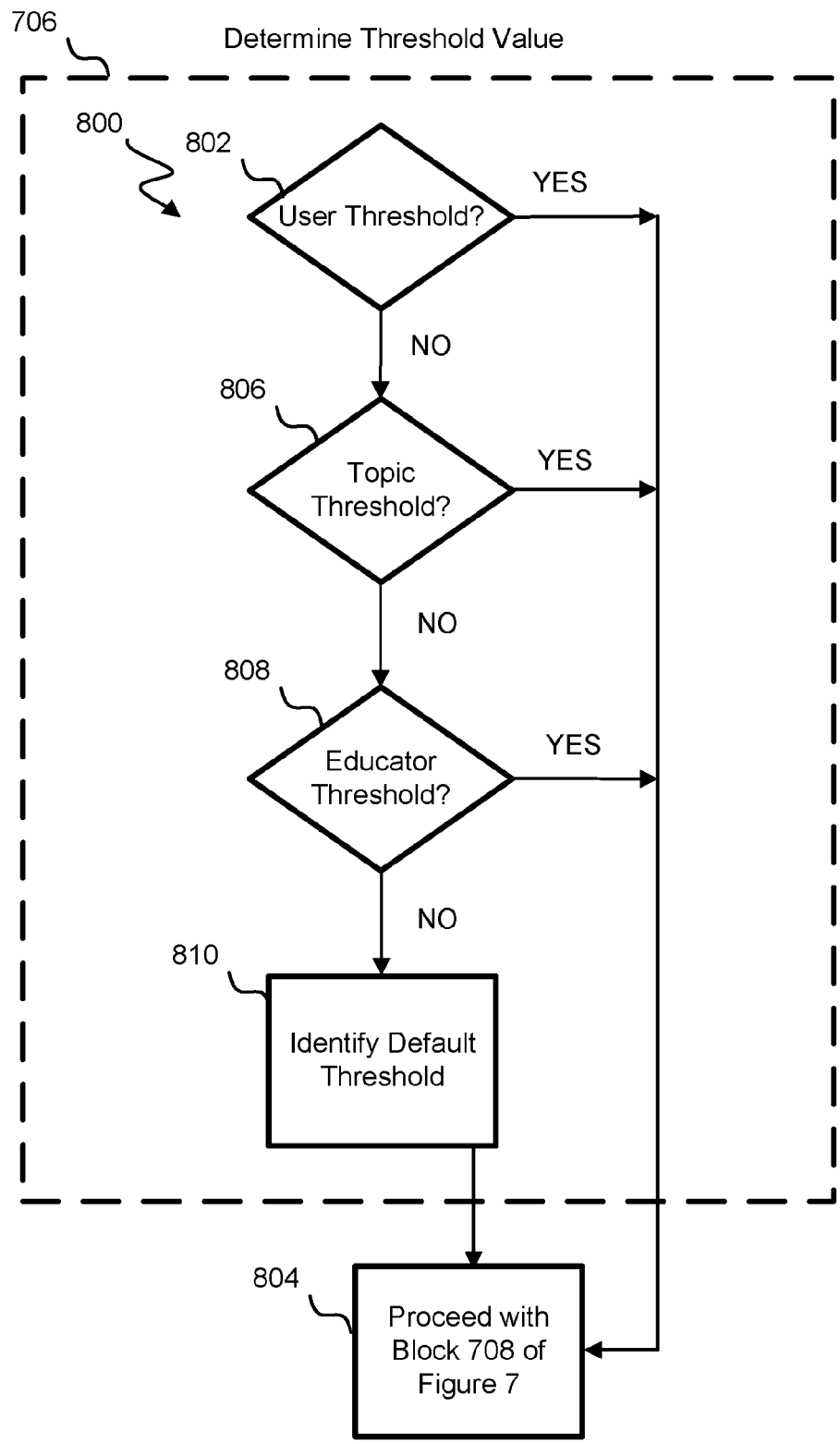
FIG. 8 illustrates a flowchart of an embodiment of a process for determining a threshold value.

With reference now to FIG. 8, an embodiment of a process 800 for determining a threshold value is shown. The process 800 is a sub process performed in block 706 of FIG. 7, wherein the threshold value is determined.

The process 800 begins at decision state 802 wherein it is determined whether the retrieved threshold data includes a threshold value specific to the user. This determination of whether the threshold data includes a threshold value specific to the user can be made by the evaluation system 310, or in embodiments in which portions of the LMS 108 are located on the user device 102, by the evaluation engine 212. If the threshold data includes a user threshold, then the process 800 proceeds to block 804, and then proceeds to block 708 of FIG. 7.

If the threshold data does not include a user threshold, then the process 800 proceeds to decision state 806 wherein it is determined whether the retrieved threshold data includes a threshold value specific to the topic associated with the questions. This determination of whether the threshold data includes a threshold value specific to the topic associated with the questions can be made by the evaluation system 310, or in embodiments in which portions of the LMS 108 are located on the user device 102, by the evaluation engine 212. If the threshold data includes a topic threshold, then the process 800 proceeds to block 804, and then proceeds to block 708 of FIG. 7.

If the threshold data does not include a topic threshold, then the process 800 proceeds to decision state 808 wherein it is determined whether the retrieved threshold data includes a threshold value specific to the educator giving the questions. This determination of whether the threshold data includes a threshold value specific to the educator giving the questions can be made by the evaluation system 310, or in embodiments in which portions of the LMS 108 are located on the user device 102, by the evaluation engine 212. If the threshold data includes an educator threshold, then the process 800 proceeds to block 804, and then proceeds to block 708 of FIG. 7.

If the threshold data does not include an educator threshold, then the process 800 proceeds to block 810 wherein a default threshold is determined. This determination of the default threshold can be made by the evaluation system 310, or in embodiments in which portions of the LMS 108 are located on the user device 102, by the evaluation engine 212. After the default threshold is identified, the process 800 proceeds to block 804, and then proceeds to block 708 of FIG. 7.

If a default threshold is not identified, the learning system 100 can query the user for a threshold value. Such a provided threshold value can be stored in the threshold database 106-A. After receiving the user provided threshold value, the process 800 can proceed to block 804, and then proceed to block 708 of FIG. 7.

If the threshold data includes a topic threshold, then the process 800 proceeds to block 804, and then proceeds to block 708 of FIG. 7.

Figure 9:
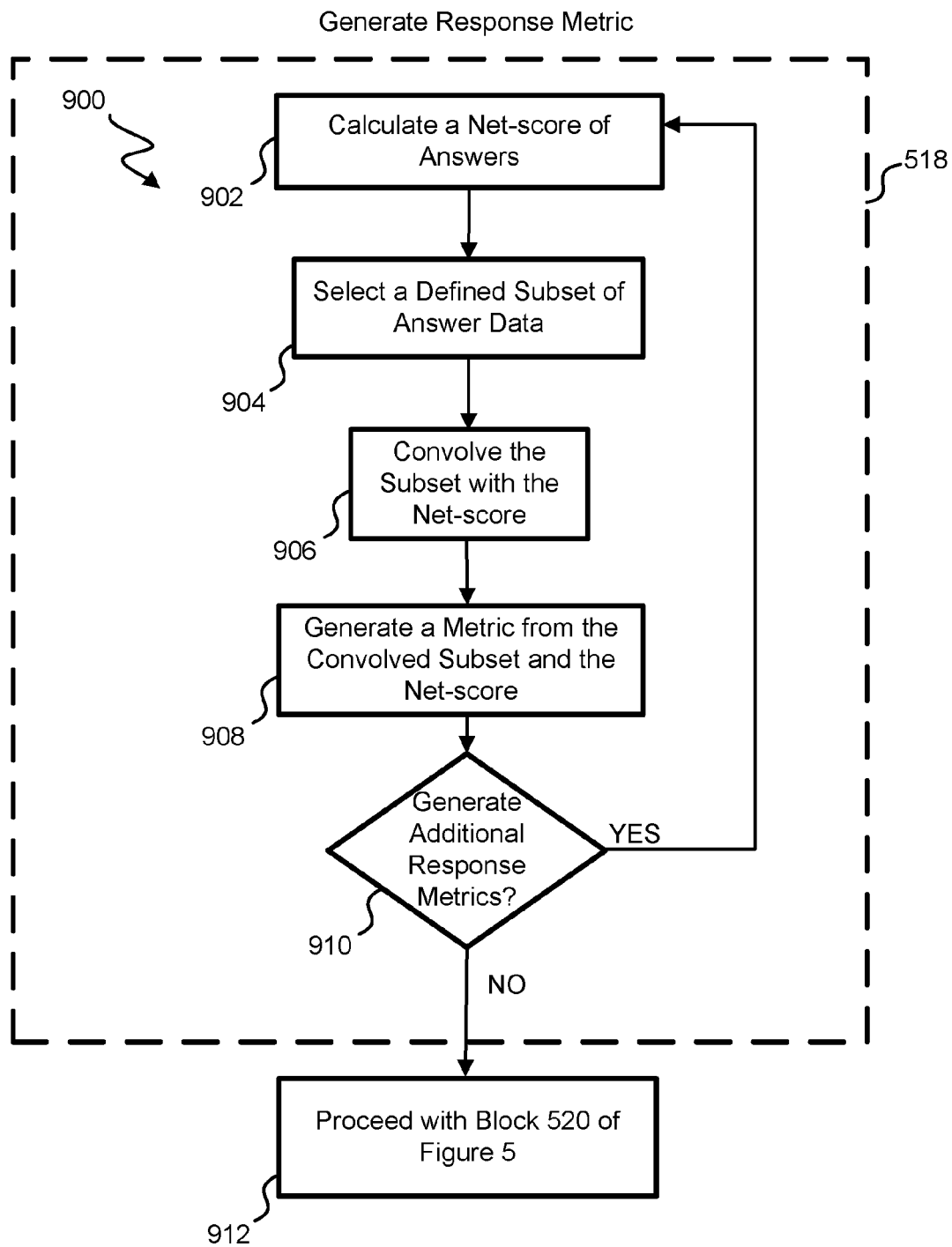
FIG. 9 illustrates a flowchart of an embodiment of a process for determining a response metric.

With reference now to FIG. 9, an embodiment of a process 900 for determining a response metric is shown. The process 900 is a sub process performed in block 518 of FIG. 5, wherein the response metric is generated. The process 900 is performed by the evaluation system 310, the evaluation engine 212, and/or the score generator 210.

The process 900 begins at block 902 wherein a net-score of answers is calculated. The net-score can be a sum of the boolean-values, such as, for example, "1" for a correct answer and "−1" for an incorrect answer, associated with the answers that the student has provided. The net-score includes input based on the number of correct answers given by the student and the number of incorrect answers given by the student. In some embodiments, the net-score can be statically calculated for a finite timeframe, and in other embodiments, the net-score can be a dynamically calculated so as to be updated as the student provides additional answers. In embodiments in which a boolean-value is assigned to each of the answers, the net-score can be the sum of the assigned boolean-values.

After the net-score is calculated, the process 900 proceeds to block 904 wherein a defined subset of answer data is selected. In some embodiments, this subset of answer data can be, for example, a number of answers that can be sequentially given to the student and/or sequentially answered by the student. In some embodiments, the subset of answer data can be less than 4, answers, less than 5 answers, less than 10 answers, less than 15 answers, less than 20 answers, less than 30 answers, less than 50 answers, less than 100 answers, less than 200 answers, less than 500 answers, or any other or intermediate number of answers. In some embodiments, the subset can be reformed as the student provides additional answers.

After the subset of data is selected and defined, the process 900 proceeds to block 906, wherein the subset of answer data is convolved with the net-score. The convolving of the subset of answer data with the net-score can include adding the answer assigned boolean-values of the subset of answer data to the net-score.

After the subset of answer data is convolved with the net-score, the process 900 proceeds to block 908 wherein a metric is generated from the convolved subset and the net-score. A variety of metrics can be generated from the convolved subset and the net-score, including metrics indicative of the degree of scatter or randomness (i.e. between correct and incorrect answers) in the student provided answers, including, for example, statistical scores, indicative of trends in the subset answer data and/or in the convolved data.

After the score is generated, the process 900 proceeds to decision state 910, wherein it is determine if additional response metrics should be generated. In embodiments in which additional answers are being received from the student, or in which unscored data exists, the decision can be made to generate additional scores. If it is determined to generate additional response metrics, the process 900 returns to block 902 and proceeds through process 900 as described above.

If it is determined to not generate additional response metrics, the process 900 proceeds to block 912, and then proceeds to block 520 of FIG. 5.

Figure 10:
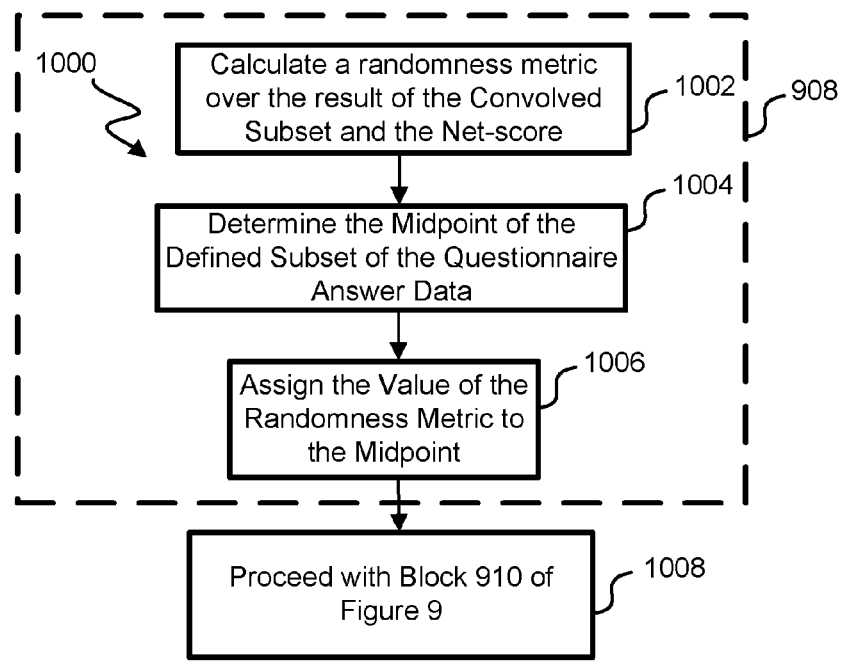
FIGS. 10 and 11 illustrate flowcharts of embodiments of a process for generating a response metric.
Figure 11:
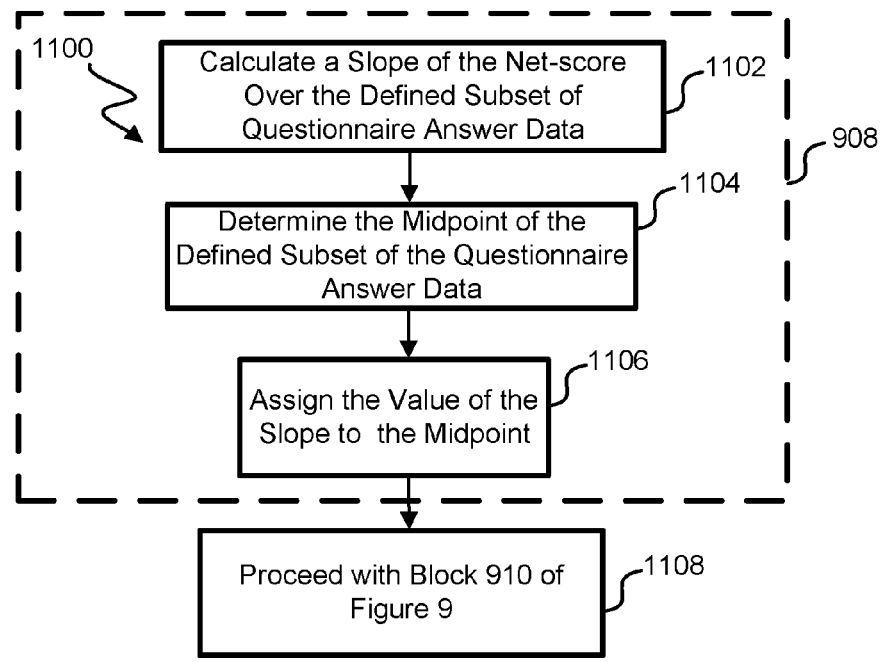

With reference now to FIGS. 10 and 11, embodiments of a process 1000 and a process 1100 a process for generating a response metric is shown. The process 1000 and the process 1100 are sub processes performed in block 908 of FIG. 9, wherein the score from the convolved subset of answer data and the net-score is generated. The processes 1000 and 1100 are performed by the evaluation system 310, the evaluation engine 212, and/or the score generator 210.

Referring now to FIG. 10, the process 1000 begins in block 1002 wherein a randomness metric is calculated over the result of the convolved subset of answer data and the net-score. The randomness metric can be any metric that describes the randomness or roughness of the answer data. In some embodiments, the randomness metric can comprise a fractal dimension, a Hausdorff dimension, a multifractal, a Hurst exponent or coefficient, a Holder exponent or coefficient, a singularity spectrum, and/or a multifractal spectrum. The fractal dimension can be calculated using a variety of algorithms for generating a fractal dimension, including, for example, a madogram algorithm such as is disclosed in "Estimators of Fractal Dimension: Assessing the Roughness of Time Series and Spatial Data" by T Gneiting, H. Ševčikova, D. B. Percival, University of Washington (Seattle) Technical Report No. 577, 2010, the entirety of which is incorporated herein by reference.

In some embodiments, the randomness metric and/or the fractal dimension can be compared to the threshold value. In such an embodiment, the threshold could correspond to a fractal dimension of 2, of 1.8, of 1.6, of 1.3, of 1.2, of 1.1, or of any other or intermediate value. In some embodiments, a fractal dimension of 2 could indicate a high level randomness in the student's answers, and thereby indicate that the student does not comprehend the topics associated with the questions. Similarly, a fractal dimension of 1.8 or 1.6 can indicate high, albeit relatively less, randomness in the student's answers, and thereby can indicate that the student does not completely comprehend the topics associated with the questions. In some embodiments, a fractal dimension of 1.3, 1.2, or 1.1 can indicate a low level or randomness in the student's answers, which may corresponds, for example, to a satisfactory level of comprehension.

After the randomness metric is calculated, the process 1000 proceeds to block 1004, wherein the midpoint of the defined subset of the questionnaire answer data is determined. The midpoint can be determined using a variety of techniques, including finding the middle number in a sequence of student submitted answers.

After the midpoint of the defined subset of the questionnaire answer data is determined, the process 1000 proceeds to block 1006, wherein the value of the randomness metric is assigned to the midpoint of the defined subset of questionnaire answer data. After the value of the randomness metric is assigned to the midpoint, the process 1000 proceeds to block 1008, and then proceeds to block 910 of FIG. 9.

Referring now to FIG. 11, the process 1100 begins in block 1102 wherein a slope of the net-score is calculated over the defined subset of answer data. The slope can be calculated using any number of known techniques.

In some embodiments, the slope can be compared to the threshold value. In such an embodiment, the threshold could correspond to a negative slope, a positive slope, or any other slope of the net-score over the defined subset of answer data. In some embodiments, a negative slope over the subset of questionnaire answer data, can correspond to a series of incorrect answers, and thereby indicate an unsatisfactory level of comprehension by the student. Similarly, in some embodiments, a positive slope over the subset of questionnaire answer data, can correspond to a series of correct answers, and thereby indicate a satisfactory level of comprehension by the student.

After the slope is calculated, the process 1100 proceeds to block 1104, wherein the midpoint of the defined subset of the questionnaire answer data is determined. The midpoint can be determined using a variety of techniques, including finding the middle number in a sequence of student submitted answers.

After the midpoint of the defined subset of the questionnaire answer data is determined, the process 1100 proceeds to block 1106, wherein the value of the slope is assigned to the midpoint of the defined subset of questionnaire answer data. After the value of the slope is assigned to the midpoint, the process 1100 proceeds to block 1108, and then proceeds to block 910 of FIG. 9.

Figure 12:
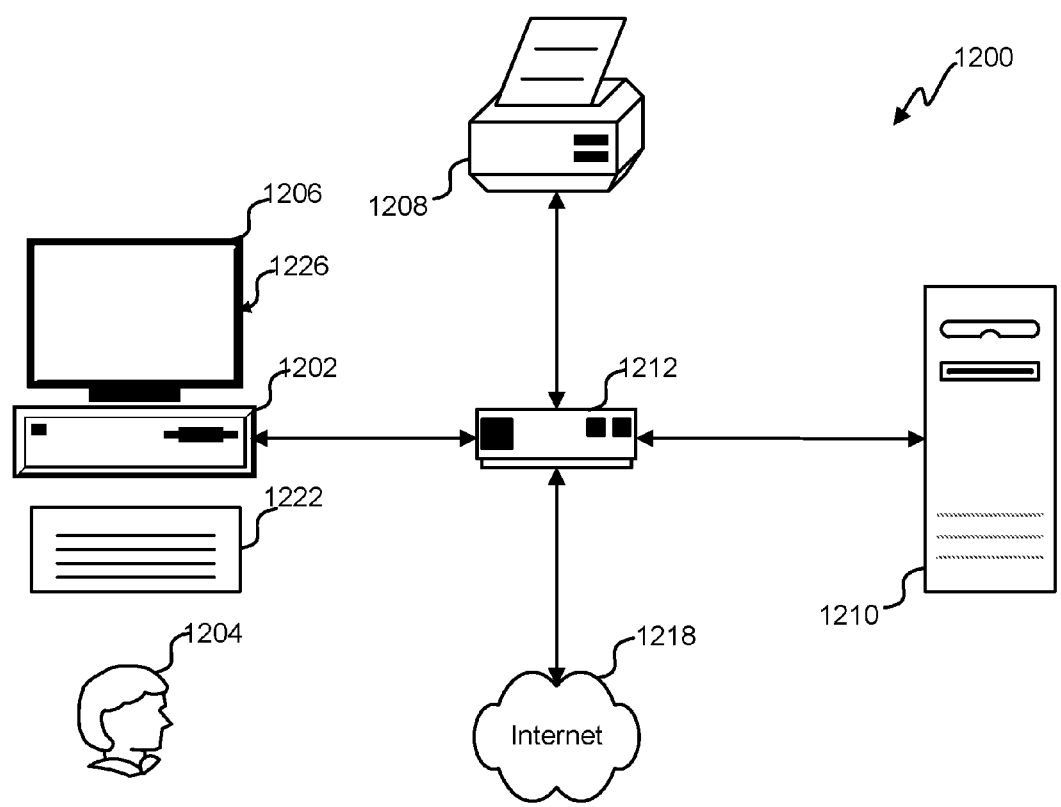
FIG. 12 depicts a block diagram of an embodiment of a computer system.

With reference now to FIG. 12, an exemplary environment with which embodiments may be implemented is shown with a computer system 1200 that can be used by a user 1204 as all or a component of a learning system 100. The computer system 1200 can include a computer 1202, keyboard 1222, a network router 1212, a printer 1208, and a monitor 1206. The monitor 1206, processor 1202 and keyboard 1222 are part of a computer system 1226, which can be a laptop computer, desktop computer, handheld computer, mainframe computer, etc. The monitor 1206 can be a CRT, flat screen, etc.

A user 1204 can input commands into the computer 1202 using various input devices, such as a mouse, keyboard 1222, track ball, touch screen, etc. If the computer system 1200 comprises a mainframe, a designer 1204 can access the computer 1202 using, for example, a terminal or terminal interface. Additionally, the computer system 1226 may be connected to a printer 1208 and a server 1210 using a network router 1212, which may connect to the Internet 1218 or a WAN.

The server 1210 may, for example, be used to store additional software programs and data. In one embodiment, software implementing the systems and methods described herein can be stored on a storage medium in the server 1210.

Thus, the software can be run from the storage medium in the server 1210. In another embodiment, software implementing the systems and methods described herein can be stored on a storage medium in the computer 1202. Thus, the software can be run from the storage medium in the computer system 1226. Therefore, in this embodiment, the software can be used whether or not computer 1202 is connected to network router 1212. Printer 1208 may be connected directly to computer 1202, in which case, the computer system 1226 can print whether or not it is connected to network router 1212.

Figure 13:
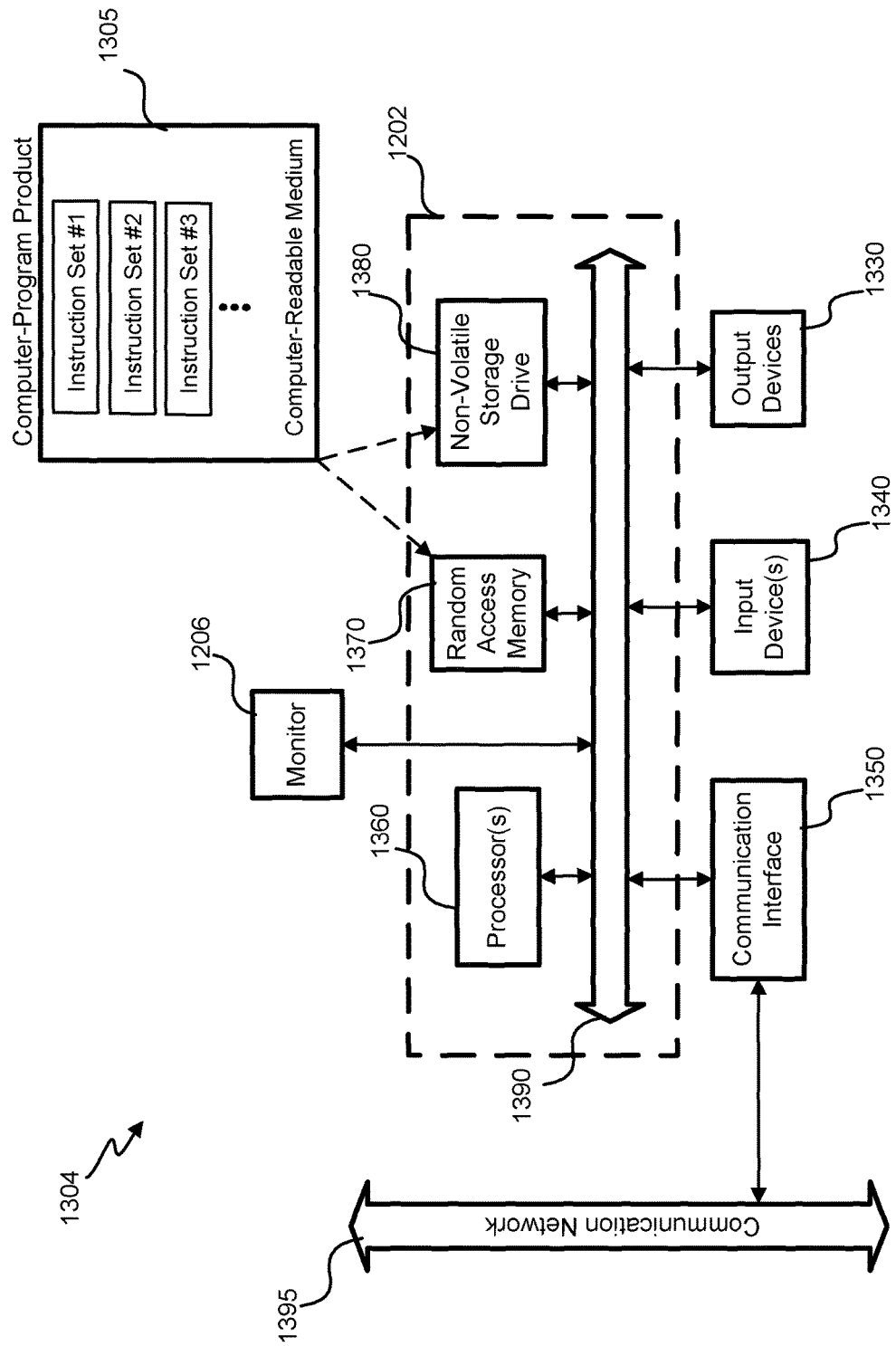
FIG. 13 depicts a block diagram of an embodiment of a special-purpose computer system.

With reference to FIG. 13, an embodiment of a special-purpose computer system 1304 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1226, it is transformed into the special-purpose computer system 1304.

Special-purpose computer system 1304 comprises a computer 1202, a monitor 1206 coupled to computer 1202, one or more additional user output devices 1330 (optional) coupled to computer 1202, one or more user input devices 1340 (e.g., keyboard, mouse, track ball, touch screen) coupled to computer 1202, an optional communications interface 1350 coupled to computer 1202, a computer-program product 1305 stored in a tangible computer-readable memory in computer 1202. Computer-program product 1305 directs system 1304 to perform the above-described methods. Computer 1202 may include one or more processors 1360 that communicate with a number of peripheral devices via a bus subsystem 1390. These peripheral devices may include user output device(s) 1330, user input device(s) 1340, communications interface 1350, and a storage subsystem, such as random access memory (RAM) 1370 and non-volatile storage drive 1380 (e.g., disk drive, optical drive, solid state drive), which are forms of tangible computer-readable memory.

Computer-program product 1305 may be stored in non-volatile storage drive 1380 or another computer-readable medium accessible to computer 1202 and loaded into memory 1370. Each processor 1360 may comprise a microprocessor, such as a microprocessor from Intel® or Advanced Micro Devices, Inc.®, or the like. To support computer-program product 1305, the computer 1202 runs an operating system that handles the communications of product 1305 with the above-noted components, as well as the communications between the above-noted components in support of the computer-program product 1305. Exemplary operating systems include Windows® or the like from Microsoft® Corporation, Solaris® from Oracle®, LINUX, UNIX, and the like.

User input devices 1340 include all possible types of devices and mechanisms to input information to computer system 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1340 are typically embodied as a computer mouse, a trackball, a track pad, a joystick, wireless remote, a drawing tablet, a voice command system. User input devices 1340 typically allow a user to select objects, icons, text and the like that appear on the monitor 1206 via a command such as a click of a button or the like. User output devices 1330 include all possible types of devices and mechanisms to output information from computer 1202. These may include a display (e.g., monitor 1206), printers, non-visual displays such as audio output devices, etc.

Communications interface 1350 provides an interface to other communication networks and devices and may serve as an interface to receive data from and transmit data to other systems, WANs and/or the Internet 1218. Embodiments of communications interface 1350 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1350 may be coupled to a computer network, to a FireWire® bus, or the like. In other embodiments, communications interface 1350 may be physically integrated on the motherboard of computer 1202, and/or may be a software program, or the like.

RAM 1370 and non-volatile storage drive 1380 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1370 and non-volatile storage drive 1380 may be configured to store the basic programming and data constructs that provide the functionality of various embodiments of the present invention, as described above.

Software instruction sets that provide the functionality of the present invention may be stored in RAM 1370 and non-volatile storage drive 1380. These instruction sets or code may be executed by the processor(s) 1360. RAM 1370 and non-volatile storage drive 1380 may also provide a repository to store data and data structures used in accordance with the present invention. RAM 1370 and non-volatile storage drive 1380 may include a number of memories including a main random access memory (RAM) to store of instructions and data during program execution and a read-only memory (ROM) in which fixed instructions are stored. RAM 1370 and non-volatile storage drive 1380 may include a file storage subsystem providing persistent (non-volatile) storage of program and/or data files. RAM 1370 and non-volatile storage drive 1380 may also include removable storage systems, such as removable flash memory.

Bus subsystem 1390 provides a mechanism to allow the various components and subsystems of computer 1202 communicate with each other as intended. Although bus subsystem 1390 is shown schematically as a single bus, alternative embodiments of the bus subsystem may utilize multiple busses or communication paths within the computer 1202.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A student comprehension measurement system to recommend remedial action comprising:
    a managed learning environment, wherein the managed learning environment comprises at least one or more networks and instructions stored in non-transitory memory that implement the managed learning environment, wherein: the managed learning environment is configured to:
        send student receive data to a remotely located student device and the managed learning environment is configured to receive student send data from the remotely located student device, and wherein:
            the student receive data sent from the managed learning environment comprises a plurality of questions and the student send data received by the managed learning environment comprises a plurality of answers to the plurality of questions; and
        send teacher receive data to a remotely located teacher device and the managed learning environment is configured to receive teacher send data from the remotely located teacher device, and
    a processor executing a portion of the instructions stored in non-transitory memory configured to automatically:
        calculate a net-score of correct answers from the plurality of answers to the plurality of questions;
        select a first subset of answers from a temporally defined subset of the plurality of answers to the plurality of questions;
        convolve the first subset of answers with the net-score of correct answers to produce a convolved subset; and
        transform the convolved subset and the net-score of correct answers into a response metric by:
            calculating a comprehension slope of the net score of correct answers over the first subset of answers;
            calculating a midpoint of the first subset of answers; and
            assigning the comprehension slope to the midpoint; and
    the managed learning environment further configured to automatically:
        create an alert to recommend remedial action for the student based on the response metric;
        send the alert to the remotely located teacher device to recommend remedial action for the student; and
        receive the response to the alert from the remotely located teacher device recommending remedial action for the student.

2. The student comprehension measurement system to recommend remedial action of claim 1, wherein the processor executing the portion of the instructions stored in non-transitory memory is further configured to generate a report identifying the student and recommending remedial action.

3. The student comprehension measurement system to recommend remedial action of claim 2,
    wherein the processor executing the portion of the instructions stored in non-transitory memory is further configured to automatically send the generated report to the remotely located teacher device.

4. The student comprehension measurement system to recommend remedial action of claim 1, wherein automatically determining to recommend remedial action comprises retrieving threshold data defining a threshold value, wherein the threshold value comprises at least one of:
  a value associated with the student;
  a value associated with student comprehension;
  a value associated with a topic; and
  a generic value.

5. The student comprehension measurement system to recommend remedial action of claim 4, wherein automatically determining to recommend remedial action further comprises comparing the response metric with the threshold data defining the threshold value.

6. The student comprehension measurement system to recommend remedial action of claim 5, wherein the threshold value is reached when the response metric reflects a negative comprehension slope.

7. The student comprehension measurement system to recommend remedial action of claim 6, wherein a report identifying the student, a course associated with the plurality of questions, and a student performance are sent to a parent device and/or an admin device.

8. The student comprehension measurement system to recommend remedial action of claim 6, wherein information related to the reached threshold value is stored in a database.

9. The student comprehension measurement system to recommend remedial action of claim 6, wherein a report identifying the student, a course associated with the plurality of questions, and a student performance are sent to the student device, the teacher device, a parent device, and/or an admin device when the threshold value is not reached.

10. The learning system to recommend remedial action of claim 1, wherein automatically determining the correctness of some of the plurality of answers to the plurality of questions comprises
  determining whether the some of the plurality of answers to the plurality of questions are correct or incorrect according to a Boolean-valued function;
  storing in the non-transitory memory a first Boolean value indicating a correct answer for correct answers sent from the student device; and
  storing in the non-transitory memory a second Boolean value indicating an incorrect answer for incorrect answers from the student device.

11. A processor-implemented method for determining student comprehension, the method comprising:
  receiving, over a network, a plurality of answers from a remotely located student device, wherein the answers are provided in response to a set of questions;
  automatically determining the correctness of the plurality of answers;
  continuously generating a response metric, wherein generating the response metric comprises:
    automatically calculating a net-score of correct answers;
    automatically selecting a temporally defined subset of the plurality of answers;
    automatically convolving the temporally defined subset with the net-score of correct answers to produce a convolved subset; and
    automatically transforming the convolved subset and the net-score of correct answers into a response metric by;
    calculating a comprehension slope of the net score of correct answers over the first subset of answers;
    calculating a midpoint of the temporally defined subset of answers; and
    assigning the comprehension slope to the midpoint; and
  automatically determining to recommend remedial action to the student based on the response metric;
  automatically, over the network, sending an alert to a remotely located teacher device to recommend remedial action for the student; and
  receiving, over the network, a response to the alert from the remotely located teacher device recommending remedial action for the student.

12. The processor-implemented method for determining student comprehension of claim 11, comprising automatically generating a report identifying a student using the remotely located student device and recommending remedial action.

13. The processor-implemented method for determining student comprehension of claim 12, wherein a report identifying the student, a course associated with the plurality of questions, and a student performance are sent to the student device, a parent device, the teacher device, and/or an admin device.

14. The processor-implemented method for determining student comprehension of claim 11, wherein automatically determining to recommend remedial action further comprises retrieving threshold data defining a threshold value, wherein the threshold value comprises at least one of:
  a value associated with the student;
  a value associated with student comprehension;
  a value associated with a topic; and
  a generic value.

15. The processor-implemented method for determining student comprehension of claim 14, wherein automatically determining to recommend remedial action further comprises comparing the response metric with the threshold data defining the threshold value.

16. The processor-implemented method for determining student comprehension of claim 15, wherein the threshold value is reached when the response metric indicates a negative comprehension slope.

17. The processor-implemented method for determining student comprehension of claim 16, wherein when the threshold is not reached a report is generated and sent to the student device, a parent device, the teacher device, and/or an admin device.

18. The processor-implemented method for determining student comprehension of claim 17, wherein the report is stored in a database.

19. The processor-implemented method for determining student comprehension of claim 15, wherein information related to the reached threshold is stored in a database.

20. The processor-implemented method for determining student comprehension of claim 11, wherein automatically determining the correctness of plurality of answers further comprises:
  determining whether the plurality of answers are correct or incorrect according to a Boolean-valued function;
  storing in the memory a first Boolean value indicating a correct answer for correct answers from the student of the student device; and
  storing in the memory a second Boolean value indicating an incorrect answer for incorrect answers from the student of the student device.

* * * * *